Dec. 14, 1965 J. J. STONE ET AL 3,223,778
FACSIMILE SYSTEM
Filed Feb. 26, 1962 5 Sheets-Sheet 1

JOSEPH J. STONE
ROMAN A. ADAMS
HENRY DAHL
PAUL J. ESTOCK
INVENTORS

BY Lyon & Lyon

ATTORNEYS

JOSEPH J. STONE
ROMAN A. ADAMS
HENRY DAHL
PAUL J. ESTOCK
INVENTORS

BY Lyon & Lyon
ATTORNEYS

FACSIMILE SYSTEM

Filed Feb. 26, 1962 5 Sheets-Sheet 3

JOSEPH J. STONE
ROMAN A. ADAMS
HENRY DAHL
PAUL J. ESTOCK
INVENTORS

BY Lyon & Lyon
ATTORNEYS

FACSIMILE SYSTEM

Filed Feb. 26, 1962 5 Sheets-Sheet 4

JOSEPH J. STONE
ROMAN A. ADAMS
HENRY DAHL
PAUL J. ESTOCK
INVENTORS

BY Lyon & Lyon

ATTORNEYS

JOSEPH J. STONE
ROMAN A. ADAMS
HENRY DAHL
PAUL J. ESTOCK
INVENTORS

BY Lyon & Lyon
ATTORNEYS

United States Patent Office 3,223,778
Patented Dec. 14, 1965

3,223,778
FACSIMILE SYSTEM

Joseph J. Stone, Glenview, Roman A. Adams, Skokie, Henry Dahl, Mount Prospect, and Paul J. Estock, Elk Grove Village, Ill., assignors to A. B. Dick Company, Chicago, Ill., a corporation of Illinois Filed Feb. 26, 1962, Ser. No. 175,445
17 Claims. (Cl. 178—7.1)

This invention relates to facsimile systems and, more particularly, to improvements therein.

In a facsimile system, usually a document is scanned and electrical signals respresentative of same are generated. These signals are transmitted to a distant location where apparatus for using these signals is present, which operates to reproduce the document from which they were derived. In the railroad industry, documents known as waybills are used for describing the contents and destination of a freight car. A waybill is usually written when the car initially starts its journey. Although the document accompanies the car, the information on the document is entered into the operating and accounting departments of each railroad through which the car passes. It is therefore very desirable to use facsimile systems for transmitting the waybill to the various locations at which its information is to be used, rather than physically transmitting the document to these locations.

The scanning system of a facsimile transmitter usually utilizes a tube having a photocathode, upon which the dissected image of a document being read, known as copy, is reflected. The analogue signals generated by the phototube, resulting from the reflected image on its photocathode surfaces, are proportional to the light intensity of the image of wavelengths within the range of spectral response of the photocathode surface. As a result, even when illumination of the original being scanned is maintained reasonably constant, a wide range of reflectivity and contrast ratios of the originals will result in wide variation of the analogue signals produced. In addition, statistical noises present in the signal must be contended with. The present state of the facsimile scanning art requires that an original document to be scanned must be selected for relative contrast ratios and reflectivity, so that fixed levels will exist in all the generated signals across which all desired signals modulate, for reliable conversion to binary signals. Such a system requires constant monitoring and/or frequent readjustments.

Furthermore, in many cases there are such variations of the reflectivity and contrast ratios over a single original documents as to be beyond the limitations of the system. For example, one of the present limitations is an ordinary pencil mark which is present within black and white original markings.

An object of this invention is the provision of a signal-generating system in a facsimile system which does not require constant signal monitoring and/or frequent readjustment.

Another object of this invention is the provision of a signal-generating system in a facsimile system which can handle wide variations in reflectivity of contrast ratios in a document being scanned.

Yet another object of the present invention is the provision of a facsimile system which can scan documents to be transmitted and can provide a reproduction from the signals generated by the scanning operation at a higher speed than has been done heretofore.

Still another object of the present invention is the provision of a novel, useful, and improved facsimile-transmission system.

These and other objects of the invention may be achieved in apparatus wherein an original document is scanned, using a photomultiplier tube for generating analogue signals representative of the information on the document. Also there are generated synchronizing signals which are necessary for the reconstruction of the transmitted signals at the receiver and for instructing paper-feeding apparatus at the receiver to start feeding paper and to terminate feeding paper. The analogue signals are converted to digital signals through processing apparatus, which includes an automatic-gain control which senses the background level of the document being scanned and adjusts the gain of the circuit so that the desired signals may be more readily separated from the various shades of background. In addition, there is a dynamic clipping circuit which senses signals present in the background signal, even if the modulation of these signals is relatively weak on a strong background signal. There is also an automatic level control which maintains a constant D.C. level on the input. Finally, a signal and time-base adder separates the synchronizing signal from the analogue signal and shapes it to the desired width for addition to the binary signal derived from the analogue signal.

At a receiver, circuitry is provided for separating the sync from the video signals. For reproducing the data received, an electrostatic printing tube is employed which has its cathode-ray beam modulated by the binary signals representative of the intelligence on the original document and deflected by sweep signals synchronized from the received sync signals.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a facsimile transmitter in accordance with this invention;

FIGURE 1*a* is a detail of the scanning drum shown in FIGURE 1;

FIGURES 2 and 3 are wave-shape diagrams of signals generated by the circuits of FIGURE 1;

FIGURES 4*a* and 4*b* are circuit diagrams of the transmitter represented by the block diagram shown in FIGURE 1;

Figure 1:
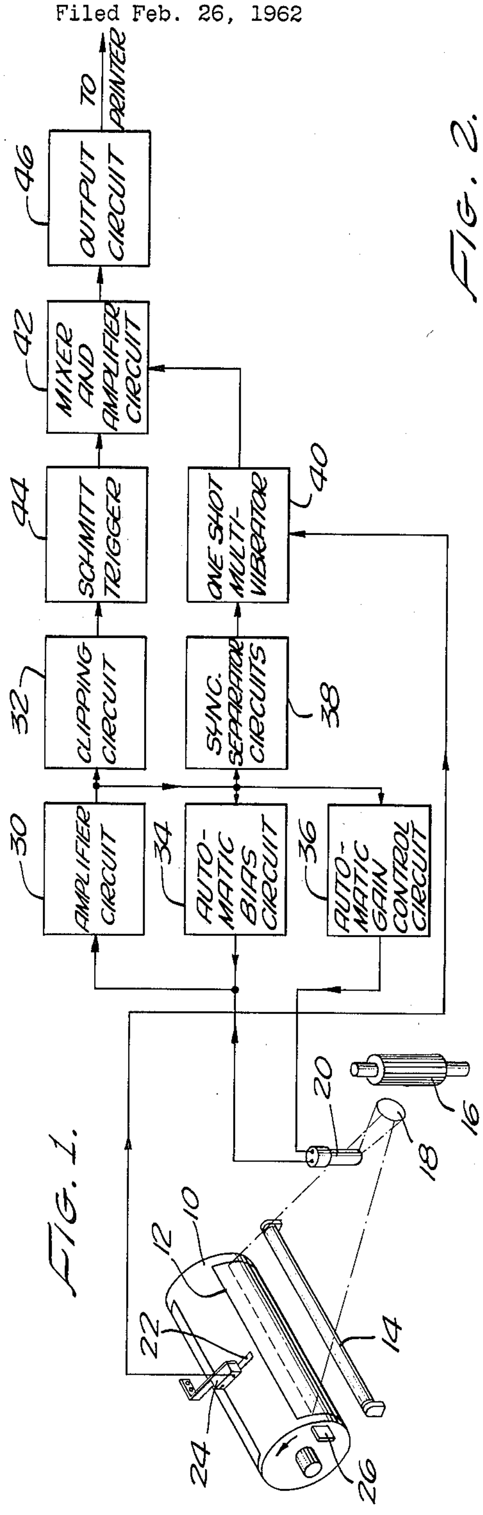

Reference is now made to FIGURE 1, which shows the transmitter portion of a facsimile system in accordance with this invention. The scanning arrangement—that is, the arrangement for converting the data on the copy into electrical signals includes a rotatable drum 10, upon which the document 12 is fastened by any suitable means to be rotatable with the drum. The document 12 is illuminated by a light, such as a line-light source 14. A many-sided mirror 16 is rotated by means, not shown, in order that a line-by-line scan of the document on the drum can be effectuated. A lens 18 serves the function of directing the light image of the line being scanned onto the many-sided mirror 16 and thereafter of focusing the reflected image onto the cathode of a photomultiplier 20.

Figure 1A:
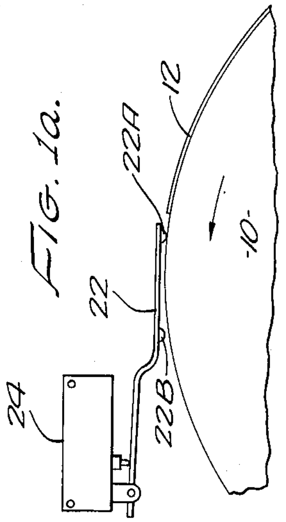

When the document 12 is first mounted on the drum, before the scanning process begins, the drum is rotated to bring the document 12 under a lever arm 22 of a microswitch 24. As shown in FIGURE 1*a*, the leading edge of the paper 12, as the drum is rotated, passes under the lever arm 22 and causes it to move upward, as a result of which the microswitch 24 can initiate a signal which will be described in more detail subsequently herein. This signal is used to inform the paper feed in the receiver to commence feeding paper. The lever arm 22 is formed so that as the trailing edge passes under the initial contact portion 22A of the lever arm, the lever arm still stays in a position to maintain the microswitch 24 actuated. This is established by elongating the lever arm 22 and providing a second contact portion 22B, which stays in contact with the copy until after the trailing edge of the document 12 passes under it. The microswitch 24 is then rendered inactive, and the paper feed at the receiver is terminated. This insures that paper is provided during the printing operation at the receiver and that all of the information will be printed out.

A synchronizing pulse is generated at the commencement of each line by a means such as a mirror 26, which is positioned adjacent the drum 10 and the light source 14, so that, as the scanning mirror 16 rotates initially at the beginning of the scan of a line, the light source 14 itself is scanned. This gives a signal that is strong enough to actually drive the following electronic circuitry into saturation and provides a sync signal for synchronizing the line printout. Following the mirror 26, the rotating mirror 16 "sees" a gray border of the drum 10 and then scans across the copy 12.

The output signal from the photomultiplier 20 is applied to an amplifier circuit 30. The output of the amplifier circuit is applied to a clipping circuit 32, to an automatic bias circuit 34, to an automatic gain-control circuit 36, and to a sync-separator circuit 38. The sync-separator circuit responds only to the signal which is generated by the rotating mirror 16 seeing the light source 14. The output of the sync-separator circuit is used to drive a one-shot multivibrator 40, which, in response thereto, produces a synchronizing signal. The width of the synchronizing signal which the one-shot multivibrator 40 generates is determined by the values of its components, which function to establish its time constant. When the microswitch 24 is actuated by the presence of copy under it, the value of the time constant of the one-shot multivibrator is made longer than when no copy is present under the microswitch. Thus, the output of the multivibrator 40, when the microswitch is actuated, is hereafter called a "wide-sync pulse" 92; when the microswitch is not actuated, the multivibrator output is a narrow-sync pulse.

The sync-signal output from multivibrator 40 is applied to a mixer and amplifier circuit 42, where they are combined with the binary video signal output of a Schmitt trigger circuit 44. An automatic bias circuit 34 applies a biasing signal to the input of the amplifier circuit 30, which has its amplitude determined from the amplitude of the input signal. The automatic bias circuit is set so that, for any input signal less than a predetermined value, the amplifier circuit provides an output. Below that predetermined value effectively the amplifier circuit operation is not affected by the automatic bias circuit. This feedback loop sets an automatic level control, so that a pedestal is established for the video signals, whereby only signals below that pedestal come through substantially unaffected, while the pedestal serves as a reference level.

The automatic gain-control circuit 36, as will be shown in more detail subsequently herein, has time constants such that it follows the slower variations of the video signal, whereby variations in paper reflectivity are taken into account. This arrangement primarily establishes the whitest signal and how far into white the circuitry can be driven. This circuitry establishes the maximum video signal below the level of the signal established by the automatic bias circuit 34.

The clipping circuit 32 operates to establish the clip level in the black region, which can be called a "coarse" clip level. Any signal that gets more "black" than the coarse clip level is considered black under all conditions and stays black. Any signal that is below the coarse clip level can be either black or white, depending on what the circuit interprets it to be. This depends upon what the background copy color is. For example, a pink sticker on a white sheet may look substantially black, when compared to the white sheet; however, the pink sticker may have information written on top of it. The intention of this circuit is to derive the information on the pink sticker, or to derive information from copy, no matter what the copy background color is.

The clipping circuit 32 provides means for following the information signal, despite the background signal, in a manner so that, when the information signal moves in a white direction, the signal is followed very rapidly by the circuitry. When the signal moves in a black direction, the signal is followed more slowly. As a result of the slow-follow of the circuitry in the black direction, the fast-follow in the white direction information may be picked up from the copy, which otherwise would be missed. For example, the letter "O" typed on a carbon may have the center of the "O" filled or smudged in, so that it is a little greyer than the border of the "O." This circuit will detect the presence of an "O" rather than a black spot by moving slowly toward the black direction when crossing the borders of the "O," but moving very rapidly in the white direction when arriving at the grey center portion. This, together with a slight accentuation of the high-frequency response of the system, magnifies the transition that takes place so that letters like "A" or "O" and the like, which may have smudged centers, are effectively "opened up." The clipping circuitry 32 accordingly functions to improve the reproduced copy at the transmitter.

The output of the clipping circuit 32 is used to drive a Schmitt trigger circuit 44. This generates a binary-type signal, representing a black or white signal. As stated previously, the Schmitt trigger circuit output is applied to the mixer and amplifier circuit 42, where it is combined with sync signals from the one-shot multivibrator 40. The output of the mixer and amplifier circuit is applied to the output circuits of the transmitter 46, the output of which is distributed to the printer circuits at the various receiving locations.

Figure 2:
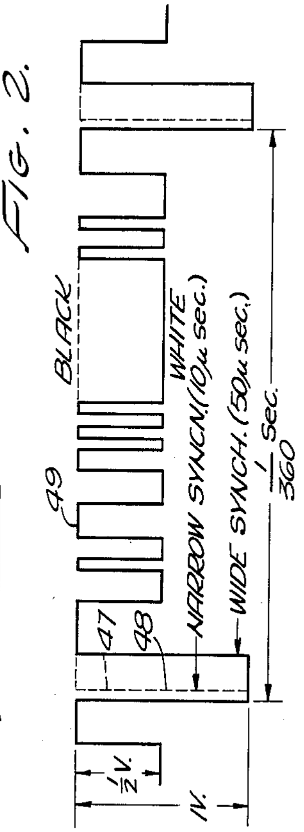

FIGURE 2 is a wave-shape drawing of the composite video-signal output of the output circuit 46. The signals are shown for one line of scan. The narrow-sync pulse 47 is drawn against the wide-sync pulse 48 to show the difference in width. The width of a narrow-sync pulse in an embodiment of this invention which was constructed was on the order of ten microseconds, whereas the width of the wide-sync pulse was on the order of fifty microseconds. The time required to scan one line, including the initiating sync-pulse was $\frac{1}{360}$ second. The video signals 49 are binary in character, representing either black or white.

Figure 3:
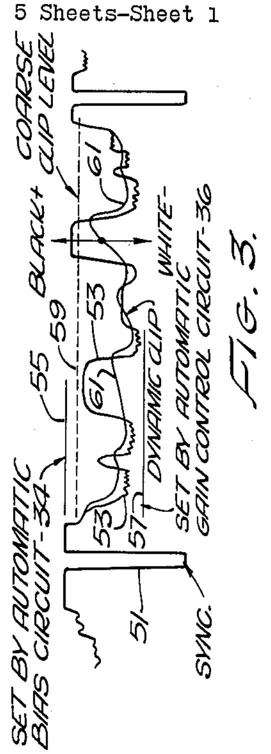

FIGURE 3 illustrates a typical wave shape of a line of signals which appears at the output of the photomultiplier 20, which is processed by the following circuitry in the manner described above. A sync signal 51 appears at the commencement of the scan of the rotating mirror 16, in response to the light reflected from the mirror 26. The signal then returns to the black level as the edge of the drum 10 is seen. Thereafter, the video signal 53 varies in accordance with the variations of the data on the copy being scanned. The pedestal level signal represented by the line 55 is set by the automatic bias circuit 34. The automatic gain-control circuit sets a whitest level for the video signal. The level is represented by the horizontal line 57. The coarse clip level, which is the black level, is represented by the dotted lines 59, and the dynamic clipping level, which effectively follows the video signals, is represented by the wave shape 61. Both the coarse clip level and the dynamic clip level are set by the clipping circuits 32.

Figure 4A:
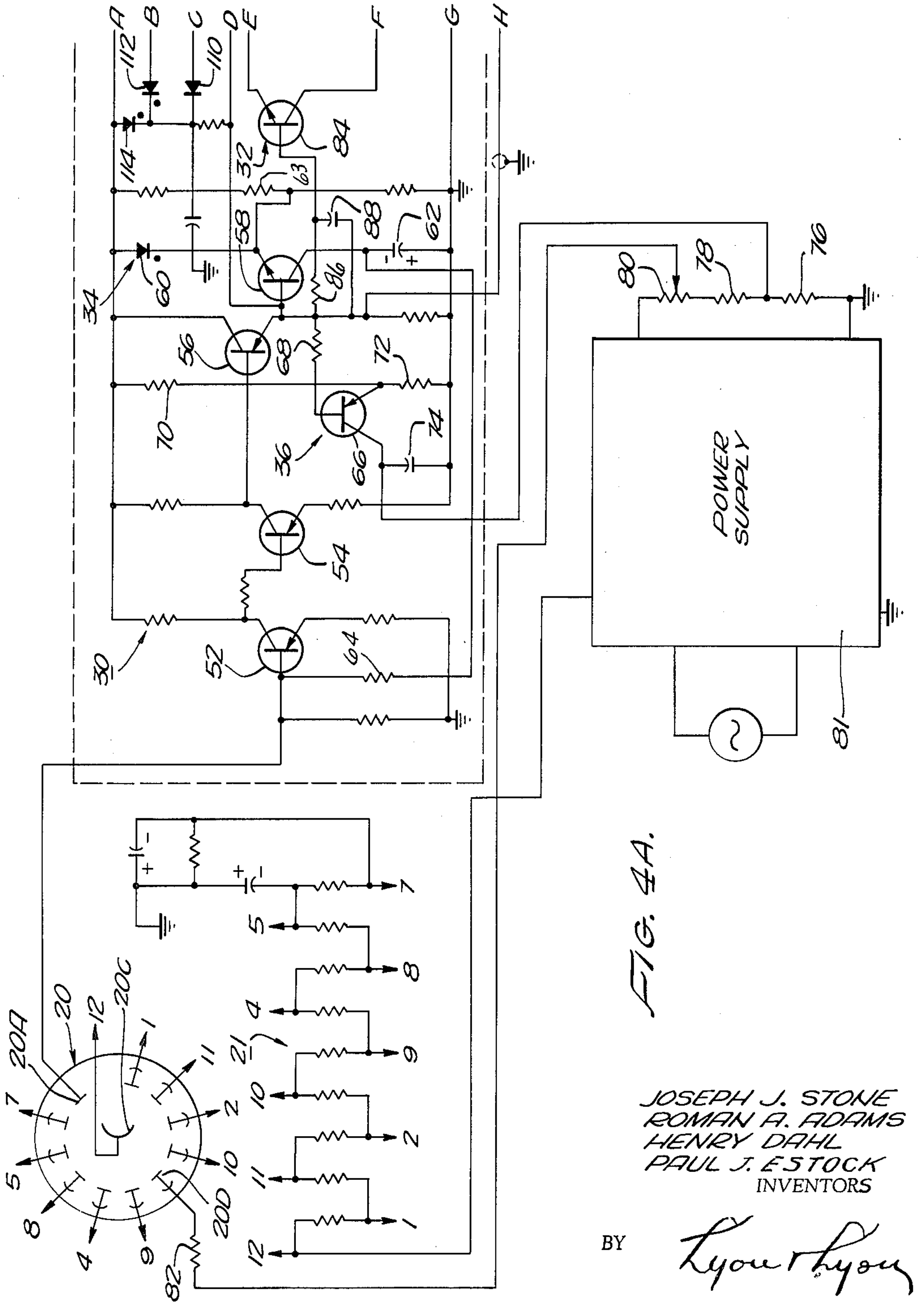
Figure 4B:
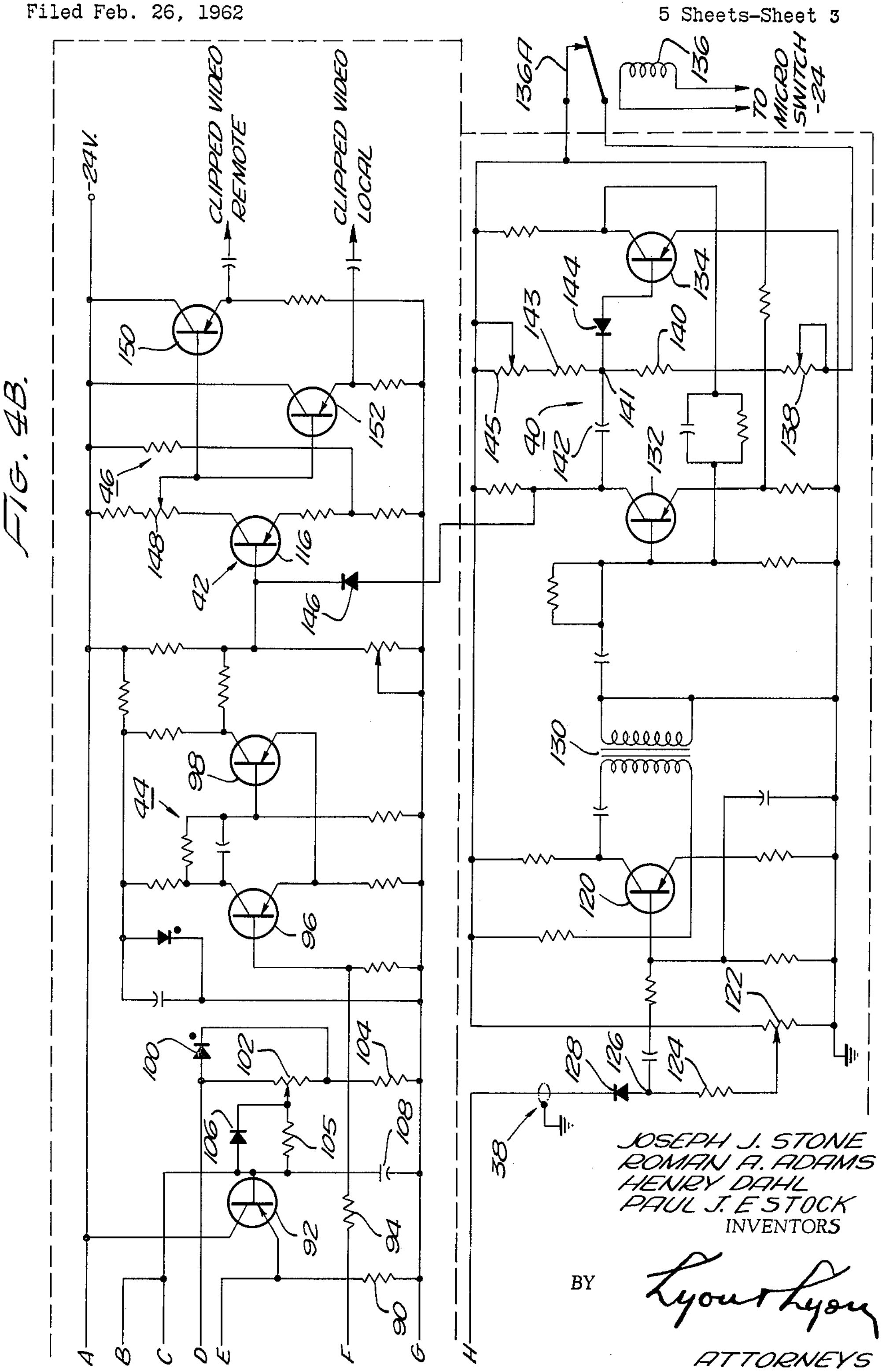

FIGURES 4*a* and 4*b* constitute a diagram of the circuits employed at the transmitter which are represented by the block diagram of FIGURE 1. The photomultiplier 20 has a photocathode 20C, a plurality of dynodes, of which the fifth dynode is designated by 20D, and an output anode 20A. Operating potential for the various dynodes, except for the fifth dynode 20D, is derived from a voltage divider 21, consisting of a series of resistors connected in series with one another and which series-connected resistors are connected across a power supply 81. The taps on the voltage divider bear the reference numerals 1 through 12, which correspond to the reference numerals of the pins on the photomultiplier tube 20, to which the dynodes and the photocathode are internally connected.

The anode 20A of the photomultiplier tube is connected to the amplifier circuit 30, which includes three D.C. coupled transistors, respectively 52, 54, and 56. The anode of the photomultiplier tube is connected to the base of transistor 52. The collector of transistor 52 is connected through a resistor to the base of transistor 54. The collector of transistor 54 is connected to the base of transistor 56, which is emitter-follower connected and is used for impedance conversion purposes, rather than for amplification of the signal.

The automatic bias circuit, or pedestal-setting function, is performed by a transistor 58, which has its base connected to the emitter of transistor 56. The emitter of transistor 58 is biased by being connected to a Zener diode 60 and to a desired potential on a resistance voltage divider 63. The voltage divider is connected across the source of operating potential. The collector of transistor 58 is connected to ground through a capacitor 62 and is connected back to the base of transistor 52 through a resistor 64. The emitter of transistor 58 is held at the desired reference voltage by the Zener diode 60. When the signal level becomes more positive than the reference voltage, transistor 58 can conduct current, with the result that the capacitor 62 can become charged by the current pulses, which flow in response to the video signal, and can thus maintain an average bias level which is applied to the base of the transistor 52. This bias level establishes the most positive level which can be handled by the circuit and establishes the pedestal of the video signals.

The automatic gain-control circuit 36 includes a transistor 66, the base of which is connected through resistor 68 to the emitter of transistor 56. The emitter of the transistor 66 is connected to a bias potential established by resistors 70 and 72 being connected in series across the source of operating potential, with the emitter being connected to the junction of the two resistors. The collector of transistor 66 is connected to ground through capacitor 74 and is also connected to the junction between two resistors, respectively 76 and 78. Resistors 76 and 78 are connected in series with a potentiometer 80. The two resistors and the potentiometer are connected across the output of the power supply 81. The movable arm of the potentiometer is connected through a resistor 82 to the dynode 20D of the photomultiplier 20. A bias for the dynode 20D is derived from the potentiometer 80. However, the gain which the video signal receives in the photomultiplier tube is controlled by the amplitude of the signal applied to the junction of the two resistors 76 and 78 from the collector of the transistor 66.

When the signal level applied to the base of transistor 66 goes more negative than the bias applied to the emitter of this transistor, then transistor 66 is enabled to conduct. This causes a negative-going change in the potential applied to the dynode 20B through the voltage-divider network. This changes the gain of the photomultiplier tube. The gain change does not take effect until the signal derived from the photomultiplier tube and applied to the base of transistor 66 exceeds the level established by the bias at the emitter of transistor 66.

Capacitor 74 together with resistor 76 insure that the signal fed back to control the photomultiplier tube is one which follows the slow changes of the input signal, which are changes due to background reflectivity changes, and not due to changes representing data.

As thus far described, the automatic gain-control circuit and the automatic bias-level control circuit work in conjunction to standardize or set limits for the video signal which appears at the emitter of the transistor 56. The signal between these limits is then applied to the clipping circuits 32. These include a transistor 84, which has signals applied to its base from the emitter of transistor 56 through a resistor 86, which is connected in parallel with a capacitor 88. The emitter of transistor 84 is connected to ground through a resistor 90 and also is connected to the emitter of a transistor 92. The collector of transistor 84 is connected through a resistor 94 to the base of a transistor 96. The Schmitt trigger circuit 44 is comprised of the transistor 96 and a transistor 98 cross-coupled therewith in well-known manner.

The gain of transistor 84 is controlled by a biasing signal applied to its emitter. Such biasing signal is established by the transistor 92 and the network associated therewith. Thus, the clipping level for the system effectively is determined by the bias level established by transistor 92 and its associated network. It should be noted at this time that the resistance-capacitance network (86, 88), which couples the emitter of transistor 56 to the base of transistor 84, affords some high-frequency peaking to the system. This accentuation of the high-frequency changes of the signal helps open up smudged characters, such as those obtained when printing through carbon paper.

A network associated with the transistor 92 includes a Zener diode 100, which is connected across a potentiometer 102. The potentiometer has one end connected to a resistor 104 which is connected to ground, and the other end is connected back to the base of transistor 58. The signal appearing at the base of transistor 58 is applied directly across the potentiometer 102 and the Zener diode 100 in series with resistance 104. Effectively, the signal is thus placed on both sides of potentiometer 102, with one side differing from the other by the voltage difference (two volts) of the Zener diode 100. In view of the presence of the series-connected resistor 104, an output can be derived from the potentiometer whose amplitude bears a preset proportional relationship to the actual signal level. The relationship is preset by the position of the potentiometer slider arm. The circuit comprising the potentiometer and Zener diode permits the D.C. level of the signal to be varied by the amount of the Zener diode voltage without losing signal. This selected voltage is applied to the base of transistor 92 through a resistor 105, which is connected in parallel with a diode 106.

A capacitor 108 couples the base of transistor 92 to ground. The signal applied to the base of transistor 92 effectively establishes the clipping level. Capacitor 108 serves to filter out the higher frequency signal components and to assist in establishing the time constant at which the automatic-clipping level can establish itself. The function of the diode 106 is to provide a low-impedance path for charging the capacitor in the negative direction. A high-impedance path exists through resistor 105 for discharging the capacitor 108 in the positive direction. This has the effect of enabling the clipping level to move rapidly toward the white signal direction and enabling it to move slowly when the signal is returning toward black.

The signal-level changes that appear on the base of transistor 92 are also limited by the presence of the diode 110 and the Zener diode 112, which is connected in parallel therewith. The diode 110 is connected between the base of transistor 92 and another Zener diode 114, which in turn is connected to the source of operating potential. Effectively, the diode 110 provides a clamping action. Any signal which is applied to the base of transistor 92 which exceeds in amplitude the voltage level applied to the cathode of the diode 110 is bypassed by this diode. Therefore, the transistor 92 is blocked from going more positive, or in the black direction, than the level to which the cathode of diode 110 is clamped.

The Zener diode 112 is provided to keep the clipping level from being upset by signals, such as the sync pulse, which tend to drive very far into the white-signal region. When this occurs, the Zener voltage value of Zener diode 112 is exceeded, and it can conduct and clamp the signal so that it does not exceed the value which would make recovery time from the extremely white-level signal too long. As a result, the recovery time is short enough after the sync signal, so that the leading edge of the video portion being scanned can be detected.

The Schmitt trigger circuit, including transistors 96 and 98, has its output applied to the base of transistor 116. This transistor comprises the mixer and amplifier circuit 42.

The output of the transistor 56, which is derived from its emitter, is applied to the sync-separator circuit 38, which includes a transistor 120 and a coupling network. This network includes a bias circuit, which picks off the bottom portion of the sync pulse and uses it to drive the transistor 120 into conduction. The bias network includes a potentiometer 122, which is connected across a source of operating potential. The potentiometer slider is connected through a resistor 124 to a junction 126. A diode 128, which passes only negative-going signals, is connected from the emitter of transistor 56 to the junction 12B. Thus, the resultant of the signal from the transistor 56 and the bias established by potentiometer 122 is applied to the base of transistor 120.

Transistor 120 applies its output, through a transformer 130, to a one-shot multivibrator circuit 40, which includes transistors 132 and 134. The one-shot multivibrator is triggered by a signal applied through the transformer 130 to the base of transistor 132.

A relay 136 has a contact pair 136A which, when closed, connects the negative terminal of the operating-potential source through a potentiometer 138 and resistor 140 to the junction 141 between a capacitor 142 and diode 144. These, in turn, are connected between the collector of transistor 132 and the base of transistor 134. A resistor 143 and a potentiometer 145 are connected in series between the junction 141 and the source of negative operating potential. The normally closed relay contact pair 136A connects potentiometer 138 and resistor 140 in parallel with potentiometer 145 and resistor 143. When the relay 136 is operated by the microswitch, its contacts open and it no longer connects the series-connected resistors and potentiometers in parallel, and the time constant of the multivibrator is controlled by resistor 143 and potentiometer 145. Thus, with relay 136 not operated, a narrower pulse output is provided than when the relay is operated. Relay 136 is maintained operated as long as copy is passing under the microswitch 24 on the drum. As long as relay 136 is operated, its contact pair 136A is opened and the effect on the univibrator circuit is to lengthen its time constant in response to any input applied to the base of transistor 132.

Output from the circuit is taken from the collector of transistor 132 and applied through a diode 146 to the base of transistor 116, where the sync pulses are mixed with the video signals. The transistor 116 has a potentiometer 148, which is connected to its collector. The slider arm of potentiometer 148 is connected to the base of a first emitter-follower-connected transistor 150, whose output is transmitted to remote locations, and to the base of a second emitter-follower-connected transistor 152, whose output may be used locally to check on the transmission.

Figure 5:
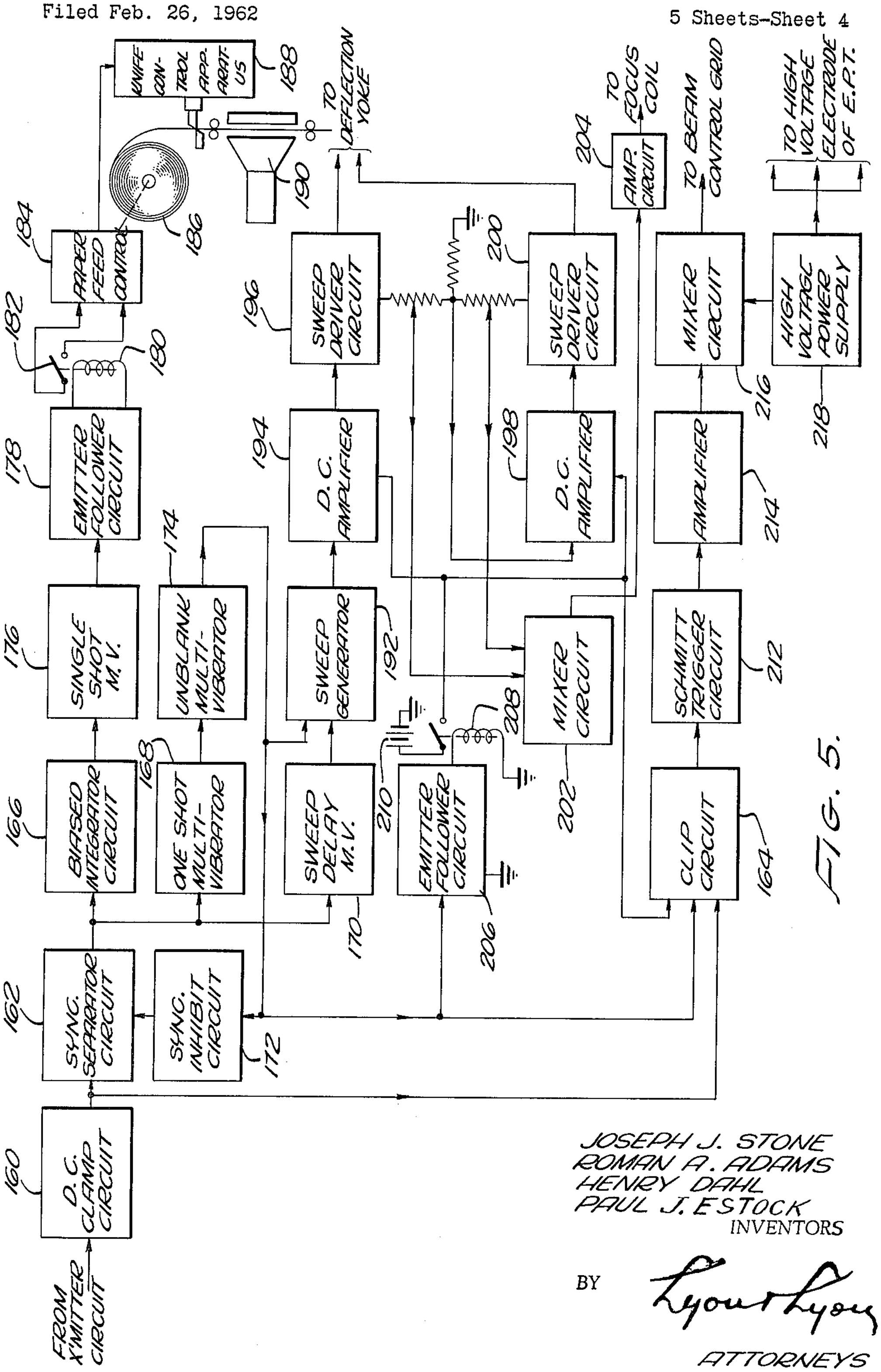
FIGURE 5 is a block diagram of a facsimile receiver in accordance with this invention.

The circuitry thus far described provides output signals of the type shown in FIGURE 2, which effectively constitutes sync signals with binary-type video signals. FIGURE 5 is a block diagram of the equipment at a receiver which is employed for converting the signals into a written copy of the original data. Signals of the type shown in FIGURE 2 may be directly transmitted or may be modulated on a carrier and transmitted to a remote location where they are demodulated from the carrier. This invention is not concerned with the apparatus employed for the actual transmission between two locations of the signals. This invention is concerned with the apparatus at the scanning location, which generates the video signals, and at the receiving locations, which takes the signals after they have been removed from the transmitting carrier and processes them in order to achieve a reproduction of the copy. Thus the received signals, after demodulation, are applied to a D.C. clamp circuit 160, which operates to clamp the top edge of the pedestal of the received signals and to re-establish a reference point against which other circuits can function. The output of the D.C. clamp circuit 160 is applied to sync-separator circuits 162 and to a clip circuit 164. The sync-separator circuits 162 serve to detect the sync signal and to reject the video signals. The sync signals which are detected are applied to a biased integrator circuit 166, to a one-shot multivibrator circuit 168, and to a sweep-delay multivibrator circuit 170.

The sync-separator circuits 162 are biased off as soon as the sync pulse has passed through, by a sync inhibit circuit 172, in order to prevent noise spikes, and any other interfering signals that might take place between sync pulses from upsetting the circuits that follow. This makes the receiver more conducive to stable operation in the presence of high-noise levels, since a gated sync-separator type of operation is used, rather than a sync-separator operation which is open all the time. One of the inputs to the sync-inhibit circuit 172, which causes it to block the operation of the sync-separator circuits for as long as its input is present, is provided by an unblanking multivibrator 174. This is driven by the output of the one-shot multivibrator 168.

The one-shot multivibrator 168 is driven from the leading edge of an incoming sync signal, whether it be wide sync or narrow sync. It establishes a delay interval which is determined as the time required between the leading edge of the sync signal and the commencement of video signals, at which time writing of transmitted data on paper should commence. The output of the one-shot multivibrator 168 then drives the unblanking multivibrator 174. The unblanking multivibrator 174 establishes an interval during which video signals to be reproduced occur. The output of the unblanking multivibrator 174 therefore, through the sync-inhibit circuit, inhibits the sync-separator circuits 162 for the interval during which video is being received.

The biased integrator circuit 166 is a well-known type of integrator circuit, such as is found in television receivers, which integrates a sync signal, and, if the resultant exceeds a predetermined level, as occurs in the presence of a wide-sync signal, then a single-shot multivibrator 176 is driven by the output of the biased integrator circuit. The output of the single-shot multivibrator drives an emitter-follower circuit 178, which operates a relay 180. This causes the contacts 182 of the relay to be closed, whereupon the paper-feed-control system 184 is energized. This causes paper to be fed from a roll 186 for a time, which lasts as long as the contacts of relay 184 are maintained closed. Since wide-sync pulses are generated for as long as the original copy is under microswitch 24 at the transmitter, at the receiver sufficient paper is fed to insure that it is present for all the data to be written thereon. When wide sync is no longer received, then relay 180 causes the paper-feed control 184 to cease feeding paper, and a knife-control apparatus 188 is automatically operated to cut the paper from the roll 186. The paper-feed control can be a motor which is operated as long as relay contacts 182 are closed. This motor drives the paper roll 186.

The paper that is fed is passed across the face of an electrostatic printing tube 190. Electrostatic printing tubes are well-known devices, which comprise a cathode-ray tube having a cathode-ray beam driven by a sweep circuit. The cathode-ray beam is gated on and off in response to video signals. The paper on which copy is to be printed is passed across the face of the tube, which has a plurality of wires extending therethrough from inside the tube. The cathode-ray beam which falls upon the wire causes it to charge up to a discharge potential which occurs from the wire through the paper to a ground plane on the other side of the paper. In this manner, with the proper type of paper, writing can occur thereon. In Patent No. 2,879,422, by Howard C. Borden and Robert W. Crews, a suitable electrostatic-printing tube and writing system are found described in some detail.

The output of the sync-separator circuit 162, as previously described, is also applied to a sweep-delay multivibrator 170. The output of the sweep-delay multivibrator 170 is applied to a sweep generator 192. The output of the unblank multivibrator 174 is also applied to the sweep generator 192. The sweep generator 192 is of the type in which a capacitor is repeatedly charged, to provide a ramp voltage, and then discharged. The inputs from the sweep-delay multivibrator and the unblanking multivibrator serve to prevent the commencement of the generation of the sweep voltage, or the charging of the capacitor until just before the leading edge of the first video signal in a line is received. This is done by discharging the capacitor in the sweep generator in response to each input signal. As a result of this operating technique, the deflection coils at the electrostatic-writing tube have a maximum time to discharge any residual magnetic field, and the commencement of the sweep-deflection voltage is properly timed to occur with the commencement of the video signals.

The output of the sweep generator is applied to a D.C. amplifier 194, where the signals are amplified and applied to a sweep driver circuit 196. This circuit amplifies the signals sufficiently to drive the deflection yoke of the electrostatic-printing tube 190.

In order to obtain the required push-pull signals for the deflection yoke, some of the sweep-drive-circuit output is applied to a D.C. amplifier 198 for amplification and subsequent application to another sweep-driver circuit 200. Its output, together with the output of the sweep-driver circuit 196, provides the push-pull signals which drive the deflection yoke of the electrostatic-printing tube 190.

In order to correct for any defocusing on the cathode-ray beam in the electrostatic tube which can arise when it is deflected to the right or to the left of center, some of the output signals from the two sweep-driver circuits 196 and 200 are taken from the resistor network connecting them and are applied to a mixer circuit 202.

This mixer circuit detects the more negative of the two signals being applied thereto and applies this to an amplifier circuit 204. The mixer circuit actually comprises diodes, which are connected in well-known fashion with their cathodes to the sweep-driver circuits, and their anodes together, so that the more negative of the two sweep-driver-circuit outputs biases off the other diode. Effectively, a triangular wave shape is derived which is applied to the focusing coil of the electrostatic deflection tube, to be superimposed upon the fixed-focusing bias for correcting any defocusing effects due to the deflection from either side of the center of the tube.

The output of the unblanking mutivibrator 174, which occurs over the interval during which the video signals occur, is applied to an emitter-follower circuit 206 and also to the clipper circuits 164. The emitter-follower circuits 206 drive a relay 208. The relay contacts connect a source of bias potential 210 to both of the D.C. amplifiers 194 and 198. These D.C. amplifiers will therefore not operate to amplify the deflection signals applied to their input until such time as the relay 208 is rendered operative, whereby the operating potential 210 is applied through the relay contacts to the D.C. amplifiers. This further insures that no sweep can be applied to the electrostatic-printing-tube deflection yokes until such time as the video interval commences.

It will be noted that the relay contacts of the relay 208 are also connected to the clip circuit 164. The same operation as has been described in connection with the D.C. amplifiers occurs here. The clip circuit cannot function until potential from the source 210 is received over the contacts of relay 208. The clip circuit 164 is also turned on by the output of the unblanking multivibrator 174. At this time, video signals are also received from the D.C. clamp circuit 160. The clip circuit 164 insures that the video signals do not exceed a predetermined negative level. The output of the clip circuit is applied to a Schmitt trigger circuit 212. The Schmitt trigger circuit squares the binary-type video signals and applies them to an amplifier 214. The amplifier amplifies these signals and applies them to a mixer circuit 216. The function of the mixer circuit is to add these amplified video signals to a high voltage from a high-voltage power supply 218. The mixer circuit output is then applied to the beam-control grid of the electrostatic-printing tube 190. High voltage for operating the electrostatic-printing tube is also derived from the high-voltage power supply 218.

Figure 6:
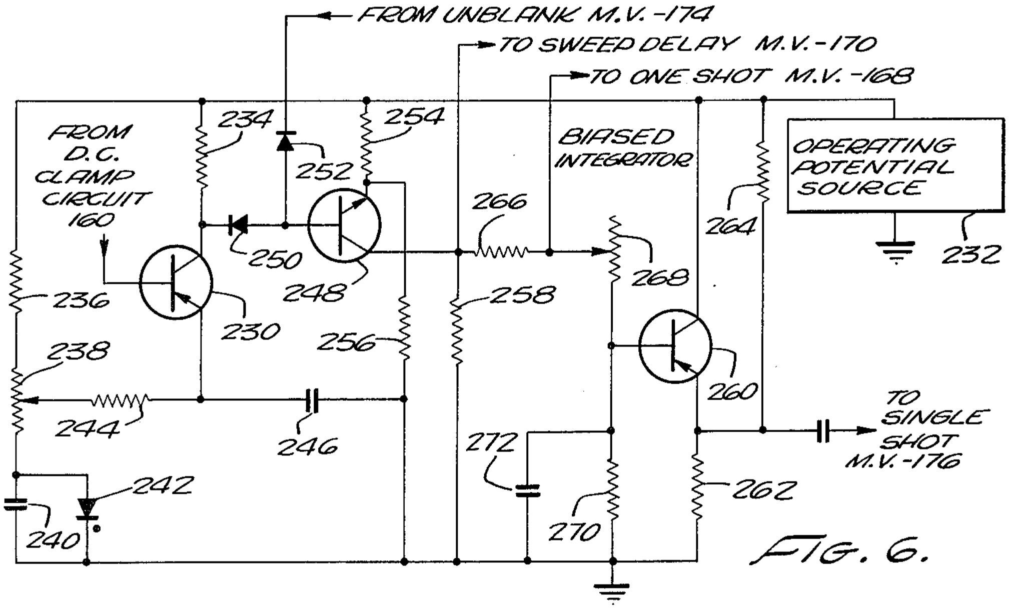
FIGURE 6 is a circuit diagram of sync-separator and biased-integrator circuits suitable for use in a receiver in accordance with this invention.

FIGURE 6 is a circuit diagram, showing details of the sync-separating circuits 162, the sync-inhibit circuit 172, and the biased integrator circuit 166. The sync-separator circuit includes a transistor 230, which has its collector connected to a source of operating potential 232 through a resistor 234. The output of the D.C. clamp circuit 160 is applied to the base of the transistor 230. Since, as will be seen by reference to FIGURE 2, the sync signals exceed the level of the video signals, sync separation is effectuated by amplitude detection. Thus, a bias for transistor 230, which must be exceeded in order to render the transistor conductive, is established by a voltage divider across the operating-potential source. This voltage divider includes a resistor 236, connected in series with a potentiometer 238, which is connected in series with a parallel circuit, including a capacitor 240 and a Zenor diode 242. The emitter of transistor 230 is also connected to ground through a capacitor 246.

The combination of the capacitor 246 and the resistor 244 operates to provide an R.C. time constant such that, as the sync pulses occur, the bias on transistor 230 increases in accordance with the amplitude of the sync. This serves to provide some self-biasing to the system and permits the system to be operated over a much wider dynamic signal range than would occur, were the circuit not provided.

Transistor 230 output is derived from its collector. This is coupled to a succeeding amplifier transistor 248 through a diode 250. The sync-inhibit circuit 172 comprises the diode 252, which connects the output from the unblanking multivibrator to the base of transistor 248, operating to clamp the base and to prevent transistor 248 from being driven in the presence of an output from the unblanking multivibrator 174. Effectively, therefore, the sync-separating circuit is inhibited in this manner.

A bias for the emitter of transistor 248 is established by resistors 254 and 256, which are connected in series across the source of operating potential. The emitter of transistor 248 is connected to the junction between resistor 254 and 256. The collector of transistor 248 is connected to ground through a resistor 258.

The biased integrator circuit is employed to reject the narrow-sync pulses and pass the wide-sync pulses for paper control, amongst other functions. This circuit includes a transistor 260, which has its collector connected to the source of operating potential and its emitter connected to ground through a resistor 262. Bias for transistor 260 is effectuated by connecting a resistor 264 between the transistor-emitter and the operating-potential source. The base of the transistor 260 is connected to a network, including a resistor 266, connected between the collector of transistor 248 and the slider arm of a potentiometer 268. The potentiometer is connected to the base of transistor 260. The base of transistor 260 is also connected to the parallel circuit including a resistor 270 and a capacitor 272, which is the integrating capacitor. The resistor and capacitor are connected to ground.

The output from transistor 248 is derived across the resistor 258. This output is applied to the sweep-delay multivibrator 170 and also through resistor 266 and potentiometer 268 to the base of transistor 260. The bias, which must be exceeded by the signal applied to the base of transistor 260, is established by the series-connected resistors 264 and 262. The time required for the signal being applied to the base 260 to exceed the bias is a function of capacitor 272 and resistor 270. These have their values selected such that the wide-sync pulse has sufficient energy to raise the level of the signal at the base of transistor 260 to exceed the bias which is applied to its emitter. The potentiometer 268 assists in setting the level of the signal applied across the integrating network. Output for the one-shot multivibrator circuit 168 is derived at the slider arm of potentiometer 268.

To summarize the operation of the circuit shown in FIGURE 6, the output of the D.C. clamp circuit, which exceeds the video-signal levels by a preset value, will cause the transistor 230 to be rendered conductive and amplify the signal applied to its base. However, the transistor 230 output will only be passed to a succeeding amplifier transistor 248 during an interval which has been established previously as a sync-pulse interval by the output of the unblanking multivibrator 174. The sync-pulse output of amplifier transistor 248 consists of either wide- or narrow-sync pulses. The integrating network at the base of transistor 260 serves to separate the narrow-sync pulses from the wide-sync pulses. Only the wide-sync pulses get through the networks and are derived at the emitter of transistor 260 for driving the single-shot multivibrator 176.

Figure 7:
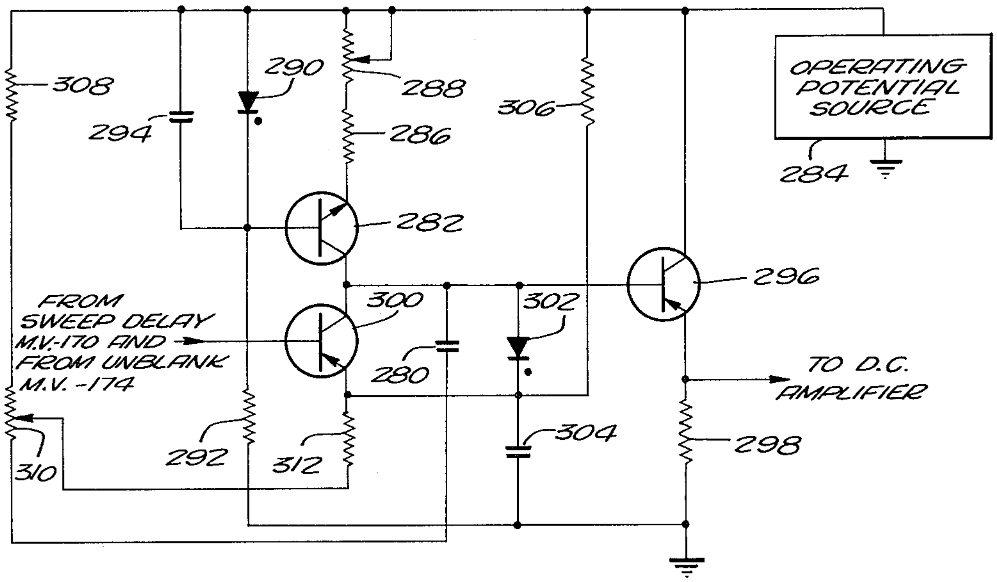
FIGURE 7 is a circuit diagram of a sweep-generator circuit, suitable for use with this invention.

FIGURE 7 is a circuit diagram of the sweep-generator circuit 192, which is shown to illustrate how this circuit operates. The sweep voltage is developed by charging a capacitor 280 through a transistor 282. The emitter of transistor 282 is connected to the source of operating potential 284 through a resistor 286, which is connected in series with a potentiometer 288. The potentiometer assists in establishing the charging rate. A constant bias voltage is applied to the base of transistor 282 by using a Zener diode 290, connected to the base from the source of operating potential. The base of the transistor 282 is also connected to ground through a resistor 292. A capacitor 294 is connected in parallel with the Zener diode 290, to assist in filtering any ripples from the power supply. The collector of transistor 282 is connected to the capacitor 280, which has its other side connected to ground. Accordingly, transistor 282 can conduct and will charge up capacitor 280 at a constant rate. A voltage across the capacitor 280 is applied to the base of an amplifier-transistor 296. This transistor has its collector connected to the source of operating potential and its emitter connected to ground through a resistor 298. Output is taken from the emitter of this transistor.

Discharge of the capacitor 288 is effectuated by a transistor 300. This transistor has its collector connected to the collector of transistor 282 and to the capacitor 280. The emitter of transistor 300 is connected to the junction of a Zener diode 302 and a capacitor 304, which are connected between the base of transistor 296 and ground. The junction of the Zener diode and capacitor are also connected to the source of operating potential through a resistor 306. Bias for the transistor 300 is derived from a voltage-divider network, which includes a resistor 308, connected in series with the potentiometer 310. These two are connected across the source of operating potential 284. The slider arm of potentiometer 310 is connected to the emitter of transistor 300 through a resistor 312.

Capacitor 280 is discharged whenever transistor 300 is rendered conductive. This transistor is rendered conductive whenever it receives an output from the sweep-delay multivibrator 170, or from the unblanking multivibrator 174. As was described previously, these signals are timed so that the capacitor 280 will not begin to be charged up to provide a ramp voltage until just before the commencement of the video signal. This operation insures that the sweep voltage starts at the proper time, together with the video signal, and provides more time for the deflection coils to dissipate any voltages therein. Thus, the sweep operation, as far as the writing tube is concerned, is made more linear, and the drive applied to the deflection coils exists only when it is needed.

The remaining circuits represented in FIGURE 5 by the block diagrams are all well known to those skilled in the art, comprising essentially amplifiers and multivibrators, and their arrangement and the configuration shown in FIGURE 5 provides no problem to those skilled in the art. Accordingly, a description of their detailed circuitry is being omitted, since it will serve only to add to the length of this description without adding to its clarity.

There has accordingly been described and shown herein a novel, useful, facsimile system which converts the information on copy to be transmitted into binary-type video signals by an arrangement which produces signals from types of copy which heretofore could not be relied on for intelligible signals. These signals are then sent to a remote location at which receiving equipment processes these signals to produce resultant copy which may be an improvement over the original copy.

We claim:

1. A facsimile transmitter for scanning copy having data thereon and background reflectance which copy is moved past a scanner for producing signals representative thereof comprising photomultiplier means for scanning said copy a line at a time and producing output signals representative of said scanning, means for actuating said photomultiplier means to produce a first synchronizing signal for each line of copy being scanned together with said output signals, a first amplifier having an input and an output on which appear output signals, means for applying said photomultiplier means output to said first amplifier input, first circuit means to which said first amplifier output is applied for deriving therefrom background signals representative of the background reflectance of said copy, means for applying said background signals to said photomultplier means to vary the gain thereof in response thereto, means for applying a bias to said first amplifier input to establish a black representative reference level including means for establishing a reference voltage, and means to which said first amplifier output signals are applied for amplifying any signals exceeding said reference voltage, network means connected to said amplifying means for smoothing the output thereof, and means for applying the output of said network means to said amplifier input, sensing means for sensing the presence of said copy as it is moved past said scanner and producing an output indicative thereof, means for separating said first synchronizing signal from said amplifier output signals, means to which the output of said sensing means and said first synchronizing signal are applied to generate a second synchronizing signal having a different energy content than said first synchronizing signal, a second amplifier having an input and an output, means to couple the output of said first amplifier to said second amplifier input, second circuit means coupled to the output of said first amplifier to derive from the output signals thereof bias signals which vary more rapidly with changes in said first amplifier output signals toward one polarity than with changes toward the opposite polarity, means to apply said bias signals to said second amplifier to vary the gain thereof responsive thereto, and means connected to said second amplifier output to combine output signals therefrom with said second synchronizing signals.

2. A facsimile transmitter as recited in claim 1 wherein said photomultiplier means includes a photomultiplier tube having a plurality of dynode electrodes, an anode and a cathode, means for applying operating potentials to said dynode electrodes, anode and cathode, said means for applying said background signals to said photomultiplier tube to vary the gain thereof in response thereto includes means for varying the operating potential applied by said means for applying operating potentials to one of said dynode electrodes responsive to said background signals.

3. A facsimile transmitter as recited in claim 1 wherein said means to which the output of said sensing means and said first synchronizing signal are applied to generate a second synchronizing signal includes a unistable multivibrator which is driven to produce an output in response to said first synchronizing signal, said unistable multivibrator having a time constant, and means, responsive to said sensing means detecting the presence of copy, to cause the value of the time constant of said unistable multivibrator to be different than what it is when said sensing means is not detecting the presence of copy.

4. A facsimile transmitter as recited in claim 1 wherein said second circuit means includes a transistor having base, emitter and collector electrodes, means for applying operating potential to said transistor having first and second output terminals, means connecting said collector electrode to said first output terminal, a capacitor connected between said base electrode and said second output terminal, means coupling said emitter electrode to said second amplifier for establishing the bias of said second amplifier, and means for applying said first amplifier output signals to said transistor base including resistance means having one end connected to said second output terminal, means to apply said first amplifier output signals to said resistance means other end, and means connected between said resistance means and said base electrode including a diode, and a resistor connected in parallel with said diode.

5. A facsimile system of the type wherein at a transmitter copy having data thereon is scanned and the signals derived as a result of such scanning are transmitted to a receiver for use in recreating said copy, said transmitter having scanning means for scanning said copy line by line and producing analogue signals representative thereof, means for converting said analogue signal to binary signals, means for generating a synchronizing signal for each line while said copy is being scanned, means for combining said synchronizing signals with said binary signals to provide composite video signals, said receiver having means for receiving said composite video signals, means for separating said synchronizing signals from said binary signals, means connected to the output of said means for separating to generate a blanking signal responsive to a synchronizing signal having the duration of a line of binary signals, means for applying said blanking signal to said means for separating said synchronizing signals for preventing the passage therethrough of any signals during said blanking signal, means coupled to the output of said means for separating for integrating said output, means responsive to output from said means for integrating exceeding a predetermined level to produce a paper-feed signal, and utilization means to which said paper-feed signal, said synchronizing signals, and said binary signals are applied for reproducing the original copy therefrom.

6. In a facsimile system of the type wherein at a transmitter there are generated composite video signals including for each line of copy being scanned a synchronizing pulse and binary pulses, an improved receiver for utilizing said composite signals for reproducing the original copy comprising separator means to which said composite signals are applied for passing only synchronizing pulses, means connected to the output of said separator means for producing in response to a synchronizing pulse a blanking pulse having a duration equivalent to the duration of a line of binary pulses, means for applying said blanking pulse to said separator means to inhibit its operation during said blanking pulse, a sweep generator, means to apply synchronizing pulses from said separator means and blanking pulses to said sweep generator to hold said sweep generator inoperative during the interval between lines of copy being scanned, and utilization means responsive to said synchronizing signals, said binary pulses and said sweep generator output to reproduce said original copy.

7. A facsimile system of the type wherein copy having data thereon is moved past scanning apparatus to be scanned a line at a time by phototube means for generating electrical signals representative of the copy being scanned, said system including a transmitter having means for generating combined paperfeed and synchronizing signals comprising means for exciting said phototube at the commencement of each line being scanned to generate a first synchronizing signal having an amplitude in excess of signals derived from copy being scanned, switch means positioned relative to said copy as it is moved past said scanning apparatus to be rendered operative by the presence of said copy, a pulse-generating circuit of the type which operates only in response to the application of a pulse, means for coupling said switch means to said pulse-generating circuit to provide it with one time constant when said switch means is operated and a second time constant which is different than said first time constant when said switch means is not operated, means for separating said first synchronizing signals from said electrical signals, means for applying said first synchronizing signals to said pulse-generating circuit to drive said pulse-generating circuit in response thereto to provide as output second synchronizing signals when said switch is operated and third synchronizing signals when said switch is not operated, means to convert said electrical signals to binary pulses, means for combining the output of said pulse-generating circuit with said binary pulses in place of said first synchronizing signals, a receiver having means for receiving said combined synchronizing signals and binary pulses, means for separating said synchronizing signals from said binary pulses, means for integrating said separated synchronizing signals to provide an integrated synchronizing signal, paper-feeding means, means responsive to the integrated synchronizing signal exceeding a predetermined amplitude to energize said paper-feeding means, and utilization means responsive to said binary pulses, said separated synchronizing signals and said energized paper-feeding means to reproduce said original copy.

8. In a system of the type wherein copy having data thereon is scanned by a phototube for generating electrical signals the improvement comprising means to which said electrical signals are applied for generating therefrom a background-level signal representative of the background reflectivity of said copy, and means for applying said background-level signal to said phototube for varying the gain thereof responsive to said background-level signal for accentuating the data-representative portion of said electrical signals.

9. In a system as recited in claim 8 wherein said means for generating a background-level signal representative of the background reflectivity of said copy includes circuit means for following changes in said electrical signals which occur at a rate which is slower than changes due to the presence of data on said copy.

10. In a system, means for scanning copy having data for generating electrical signals comprising a photomultiplier tube having a plurality of dynode electrodes, and anode, and a cathode, means for applying operating potentials to the dynode electrodes, anode and cathode of said photomultiplier tube, means for deriving signals from said photomultipler tube anode representative of the combination of the background reflectance of said copy and the data thereon, circuit means for deriving from said signals derived from said photomultiplier tube anode background-level signals representative of the background reflectance of said copy, and means for varying the operating potential applied to one of the dynodes of said photomultiplier tube responsive to said background-level signal to vary the gain of said photomultiplier tube in accordance therewith.

11. In a system of the type wherein copy having data thereon is moved past scanning apparatus to be scanned a line at a time by a phototube means for generating electrical signals, means for generating combined paper-feed and synchronizing signals comprising means for exciting said phototube at the commencement of each line being scanned to generate a first synchronizing signal having an amplitude in excess of signals derived from copy being scanned, sensing means for sensing the presence of said copy as it is moved past said scanning apparatus and producing an output indicative thereof, means to which said first synchronizing signal and the output of said sensing means is applied to generate a second synchronizing signal in response to both having an energy content which is different than the energy content of said first synchronizing signal, and means for combining said second synchronizing signal with said electrical signals to provide both paper-feed and line-synchronizing information.

12. In a system of the type wherein copy having data thereon is moved past scanning apparatus to be scanned a line at a time by a phototube means for generating electrical signals, means for generating combined paper-feed and synchronizing signals comprising means for exciting said phototube at the commencement of each line being scanned to generate a first synchronizing signal having an amplitude in excess of signals derived from copy being scanned, switch means positioned relative to said copy as it is moved past said scanning apparatus to be rendered operative by the presence of said copy, a pulse-generating circuit of the type which operates only in response to the application of a pulse, means for coupling said switch means to said pulse-generating circuit to provide it with one time constant when said switch is operated and a second time constant which is different than said first time constant when said switch is not operated, means for separating said first synchronizing signals from said electrical signals, means for applying said first synchronizing signals to said pulse-generating circuit to drive said pulse-generating circuit in response thereto to provide as output second synchronizing signals when said switch is operated and third synchronizing signals when said switch is not operated, and means for inserting the output of said pulse-generating circuit into said electrical signals in place of said first synchronizing signals.

13. In a system of the type wherein copy having data thereon is scanned by means for generating electrical signals representative thereof, an improved clipping circuit comprising an amplifier, means for applying said electrical signals to said amplifier to be amplified, means to which said electrical signals are applied to derive therefrom a bias signal which has an average value substantially determined by the average reflectance of the copy being scanned and which varies more rapidly with changes in said electrical signal toward one polarity than with changes toward the opposite polarity, and means to apply said bias signal to said amplifier to control the gain thereof in response thereto.

14. In a system as recited in claim 13, wherein said amplifier comprises a transistor having base, emitter and collector electrodes, said means to apply said bias signals to said amplifier includes a connection to the emitter of said transistor, and said means for applying said electrical signals to said amplifier includes a high-frequency-peaking network connected to the base of said transistor.

15. In a system of the type wherein copy having data thereon is scanned by means for generating electrical signals representative thereof, an improved clipping circuit comprising an amplifier, means for applying said electrical signals to said amplifier to be amplified, a bias circuit connected to said amplifier to control the gain thereof, said bias circuit comprising a transistor having base, emitter and collector electrodes, means for applying operating potential to said transistor having first and second output terminals, means connecting said collector electrode to said first output terminal, a capacitor connected between said base electrode and said second output terminal, means coupling said emitter electrode to said amplifier for establishing the bias of said amplifier, and means for applying said electrical signals to said transistor base including resistance means having one end connected to said second output terminal, means to apply said electrical signals to said resistance means other end, and means connected between said resistance means and said base electrode include a diode, and a resistor connected in parallel with said diode.

16. In a system as recited in claim 15 wherein said resistance means includes a potentiometer, a resistor having one end connected to one end of the resistor of said potentiometer and the other end connected to said second output terminal, and a Zener diode connected across said potentiometer resistor, said potentiometer slider being connected to said parallel-connected diode and resistor.

17. In a system as recited in claim 15 wherein said bias circuit includes a clamp circuit comprising a diode, a first Zener diode connected between said first output terminal and one side of said diode, means connecting the other side of said diode to the base of said transistor, and a second Zener diode connected in parallel with said diode.

References Cited by the Examiner

UNITED STATES PATENTS

| | | | |
|---|---|---|---|
| 2,718,548 | 9/1955 | Jelinek | 178—7.1 |
| 2,730,567 | 1/1956 | McConnell | 178—7.1 |
| 2,855,513 | 10/1958 | Hamburgen et al. | 328—147 |
| 2,999,925 | 9/1961 | Thomas | 325—320 |

DAVID G. REDINBAUGH, *Primary Examiner.*